United States Patent
Oiwa

(10) Patent No.: US 7,263,341 B2
(45) Date of Patent: Aug. 28, 2007

(54) AUDIO DEMODULATING CIRCUIT AND TELEVISION BROADCAST RECEIVER

(75) Inventor: Koji Oiwa, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 564 days.

(21) Appl. No.: 10/360,649

(22) Filed: Feb. 10, 2003

(65) Prior Publication Data

US 2003/0199263 A1  Oct. 23, 2003

(30) Foreign Application Priority Data

Apr. 22, 2002 (JP) .............................. 2002-119627

(51) Int. Cl.
*H04B 7/00* (2006.01)

(52) U.S. Cl. ............... 455/260; 455/264; 455/337; 455/180.3; 375/327; 348/726

(58) Field of Classification Search .............. 455/180.3, 455/193.1, 193.2, 313, 314, 323, 377, 340, 455/179.1, 180.1, 180.2, 255–260, 264, 307, 455/312, 337; 375/324–327, 376; 348/536, 348/725, 726

See application file for complete search history.

(56) References Cited

U.S. PATENT DOCUMENTS

| | | | | |
|---|---|---|---|---|
| 4,188,639 A | * | 2/1980 | Murakami et al. ........... | 348/728 |
| 4,206,412 A | * | 6/1980 | Tsurumaru ................... | 455/307 |
| 4,322,751 A | * | 3/1982 | Hongu et al. ................ | 348/735 |
| 4,355,413 A | * | 10/1982 | Sato ........................ | 455/183.1 |
| 4,403,344 A | * | 9/1983 | Yamada et al. ........... | 455/181.1 |
| 4,903,328 A | * | 2/1990 | Ichikawa .................. | 455/165.1 |
| 5,317,216 A | * | 5/1994 | Hosoya et al. .............. | 327/555 |
| 5,361,406 A | * | 11/1994 | Wignot et al. ........... | 455/200.1 |
| 5,479,136 A | * | 12/1995 | Endo et al. ..................... | 331/2 |
| 5,673,088 A | * | 9/1997 | Nah .......................... | 348/555 |
| 5,768,697 A | * | 6/1998 | Shirakawa ............... | 455/181.1 |
| 6,006,078 A | * | 12/1999 | Yamamoto et al. ......... | 455/264 |
| 6,094,229 A | * | 7/2000 | Ohshima .................... | 348/555 |
| 6,327,464 B1 | * | 12/2001 | Hayasaka ................... | 455/286 |
| 6,396,354 B1 | * | 5/2002 | Murayama et al. .......... | 331/17 |
| 6,917,390 B2 | * | 7/2005 | Sasaki ........................ | 348/731 |

FOREIGN PATENT DOCUMENTS

JP  9-298754 A  11/1997

* cited by examiner

*Primary Examiner*—Edward F. Urban
*Assistant Examiner*—Nhan T. Le
(74) *Attorney, Agent, or Firm*—Birch, Stewart, Kolasch & Birch, LLP

(57) ABSTRACT

An audio demodulating circuit in accordance with the present invention for demodulating audio signals in a plurality of broadcast systems of mutually different frequency deviations such as the NTSC and the PAL, is arranged such that a connection between a trap circuit for suppressing adjacent interference and an intermediate frequency signal line can be controlled without using an externally applied special signal, based on a control voltage applied from a phase comparator with respect to a voltage control oscillator which generates a local oscillation signal for extracting an audio signal from the intermediate frequency signal.

10 Claims, 9 Drawing Sheets

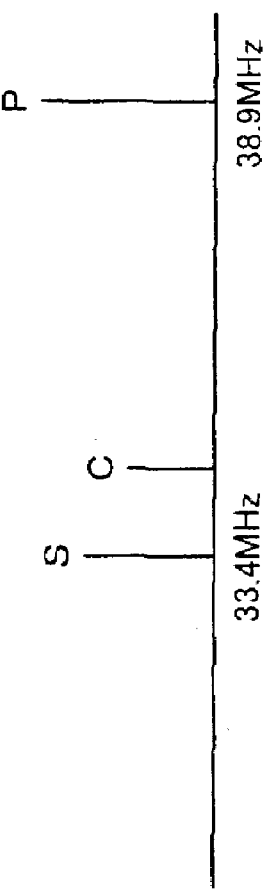
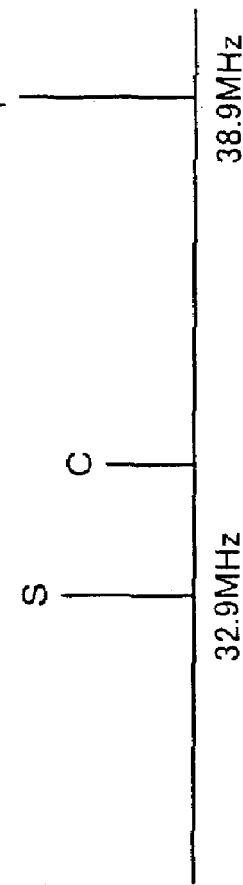
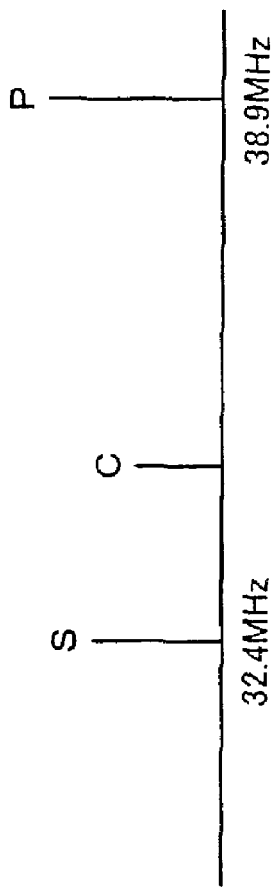
FIG. 7 (a) SYSTEM-B/G
FIG. 7 (b) SYSTEM-I
FIG. 7 (c) SYSTEM-D/K

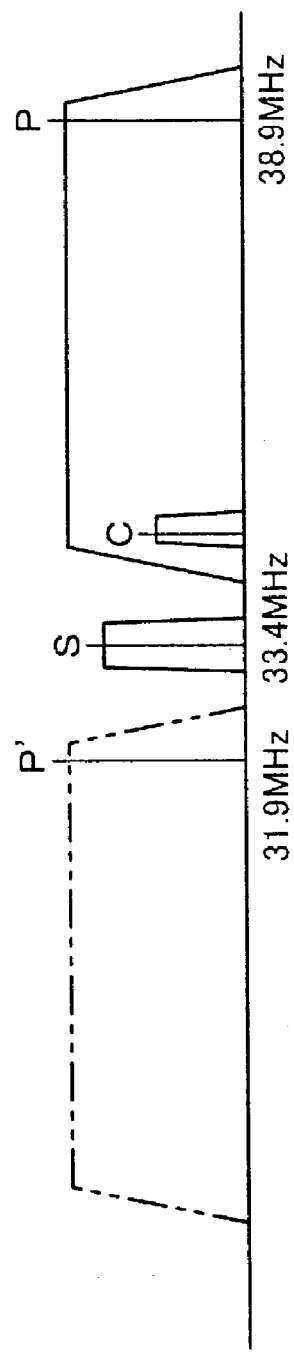
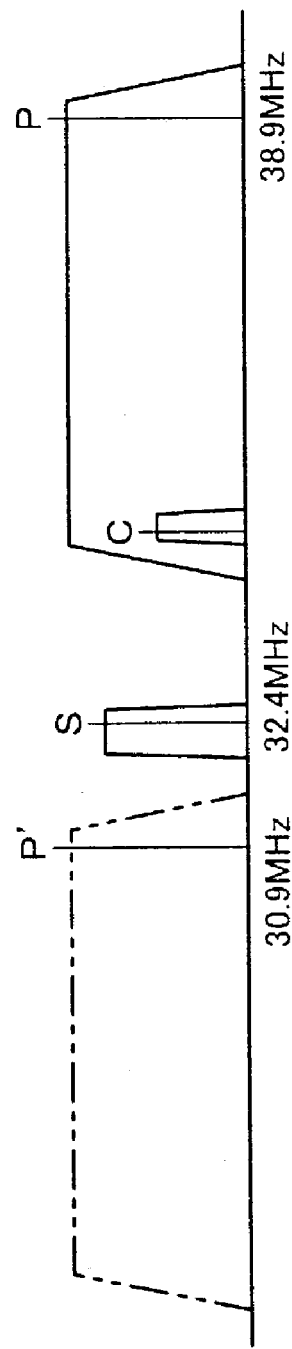
FIG. 8 (a)
FIG. 8 (b)

AUDIO DEMODULATING CIRCUIT AND TELEVISION BROADCAST RECEIVER

This nonprovisional application claims priority under 35 U.S.C. § 119(a) on Patent Application No. 2002-119627 filed in JAPAN on Apr. 22, 2002, which is herein incorporated by reference.

FIELD OF THE INVENTION

The present invention relates to an audio demodulating circuit called "demodulator" for demodulating an audio signal, which is suitably mounted in a television broadcast receiver such as a set-top box for TV, VTR, CATV, etc., and more particularly relates to an audio demodulating circuit for demodulating audio signals in a plurality of broadcasting systems adopting mutually different frequency deviations, such as the NTSC (National Television System Committee) and the PAL (Phase Alternation by Line-color television), etc.

BACKGROUND OF THE INVENTION

For the ground wave television broadcasting, a variety of broadcasting systems are currently available. For such ground wave television broadcasting, the M(NTSC) system is generally used in Japan and the United State. In this M(NTSC) system, the number of scanning lines is set to 525, the channel band width is set to 6 MHz, and the frequency difference between the video carrier wave and the audio carrier wave is set to 4.5 MHz.

In Germany, the B-system (PAL) is adopted in the VHF (Very High Frequency) band width, whereas the G-system (PAL) is adopted in the UHF (Ultra High Frequency) band width. In the B-system, the number of scanning lines is set to 625, the channel band width is set to 7 MHz, and the frequency difference between the video carrier wave and the audio carrier wave is set to 5.5 MHz. In the G-system, the number of scanning lines is set to 625, the channel band width is set to 8 MHz, and the frequency difference between the video carrier wave and the audio carrier wave is set to 5.5 MHz. As in this case of Germany, there are cases where different broadcasting systems are adopted even within the same country.

Particularly, the European region where many countries are adjacently located is in an environment of mixed broadcasting systems are mixed, including not only the above-explained broadcasting systems but also the I-system with the frequency difference between the video carrier wave and the audio carrier wave of 6.0 MHz, and the D-system and the K-system with the frequency difference between the video carrier wave and the audio carrier wave of 6.5 MHz.

On the other hand, in the television broadcast receiver, a receiving high frequency signal (hereinafter referred to as a receiving RF signal) is once converted into an intermediate frequency signal (hereinafter referred to as an IF signal). The IF signal is then separated into a video signal component (hereinafter referred to as a VIF signal) and an audio signal component (hereinafter referred to as a SIF signal). Then, by mixing a local oscillating signal (hereinafter referred to as an LO signal) with the SIF signal, it is possible to be demodulated into an audio signal. This is based on such characteristic that the lower is the frequency, the simpler is the structure of a wave detector, and for this reason, almost all the wave detectors are arranged so as to demodulate an audio carrier frequency signal after once being converted into a SIF signal.

FIG. 5 is a block diagram showing an electrical structure of a television broadcasting receiver 1 applicable to the NTSC and PAL broadcasting systems for demodulating using such SIF signal. The receiving RF signal as input from an antenna 2 is first input to an input turning circuit 3 composed of a band pass filter, where only a signal component as desired is extracted. Then, after being amplified by a frequency amplifying circuit 4, the RF signal is input to an inter-stage turning circuit 5 composed of a band pass filter, where further unnecessary signal component is extracted. This RF signal is then input in a mixer 6 to be mixed with an LO signal generated in a local oscillating circuit 7. The IF signal is then subjected to frequency conversion to obtain the IF signal.

The foregoing IF signal is input in common between SAW filters 8 and 9 applicable to the NTSC broadcasting system and the PAL broadcasting system, and the video signal component (VIF signal) and the audio signal component (SIF signal) are extracted. For these SAW filters 8 and 9, a SAW filter for video and a SAW filter for audio may be adopted separately. Then, depending on which of the NTSC broadcasting and the PAL broadcasting is to be received, from either the SAW filter 8 or the SAW filter 9, the VIF signal can be applied to a video IF amplifying circuit (VIF AMP) 10, and the SIF signal can be applied to an audio IF amplifying circuit (SIF AMP) 11.

The VIF signal as amplified in the video IF amplifying circuit 10 is subjected to video wave detection to be formed into a video signal in a video wave detecting circuit (Video DET) 12, and the video signal is output after being amplified in a video amplifying circuit (Video AMP) 13.

The SIF signal as amplified in the audio IF amplifying circuit 11 is subjected to wave detection (frequency conversion) in an audio demodulating circuit (QIF DET) 14 to be formed into an SIF signal of 4.5 MHz in the case of adopting the NTSC (M-system), and an SIF signal of 5.5 MHz in the case of adopting the PAL (B-system or G-system) respectively. Then, after being subjected to the FM wave detection in an FM detecting circuit (FM DET) 15, the SIF signal is output as an audio signal.

For the receiver 1 having the foregoing structure, a particular broadcasting system is set in each country; however, the broadcasting system becomes of more commercial value by setting such that a television program being broadcasted in one of the neighboring countries can be seen in other neighboring countries. However, in order to receive television broadcasting of all the broadcasting systems, the audio demodulating circuit 14 of an extremely complicated structure is needed.

At present, many Integrated Circuits (ICs) are developed for the described receiver 1, and therefore the foregoing problem can be solved by the 1-chip IC (many systems can be received by one IC). The problem of the frequency difference between the video carrier wave and the audio carrier wave as the most series problem in receiving the television programs in a variety of broadcasting systems may be resolved by adopting the PLL (phase-locked loop) for the audio demodulating circuit 14.

FIG. 6 shows one example of the audio modulating circuit 14 when adopting the PLL. In the generally used television broadcasting, a SIF signal obtained by FM demodulating an audio signal is superimposed in a video signal, and the resulting signal as superimposed is further modulated before being transmitted. Therefore, the frequency of the SIF signal is given by a frequency difference between the video carrier wave and the audio carrier wave. For example, in the M-system, the frequency difference is set to 4.5 MHz, whereas in the B-system, the frequency difference is set to 5.5 MHz.

In the audio demodulating circuit 14, a sine wave LO signal having the same frequency as the SIF signal is prepared by a voltage control oscillator (VCO) 21, and is mixed with a SIF signal in a mixer 22. Then, by taking the difference between the SIF signal and the sine wave LO signal of the same frequency, an audio output is extracted to a FM wave detecting circuit 15. The LO signal is a complete sine signal, which is a clear signal basically without being modulated nor containing noise.

Therefore, following the changes in frequency of the SIF signal, it is required to accurately prepare the LO signal having the same frequency. In response, the phase differences between the SIF signal and the LO signal are mutually compared in the phase comparator 23, and the control voltage corresponding to the phase difference is applied to the VCO 21. As a result, the frequency of the LO signal can be set to the frequency of the SIF signal. These VCO signal 21 and the phase comparator 23 prepare PLLs, and the LO signal corresponding to SIF signals of a variety of frequencies.

However, required performances cannot be ensured merely by adopting the PLL circuit for the audio demodulating circuit 14. Therefore, in its application to high quality model, it is required to control the audio demodulating circuit 14 by a control signal from an external section of the audio demodulating circuit 14. This is to correspond to the neighboring interferences regulated by the CENELE standard (European Committee for Electrotechnical Standard). In the following, the neighboring interference will be explained in reference FIGS. 7(a) to 7(c), and FIGS. 8(a) and 8(b).

FIGS. 7(a) to 7(c) are diagrams, each illustrating a spectrum of the IF signal. Specifically, FIG. 7(a) illustrates spectrums of the B-system and the G-system, FIG. 7(b) illustrates a spectrum of the I-system; and FIG. 7(c) illustrates a spectrum of the D-system and the K-system, wherein "C" indicates a carrier frequency, "P" indicates a central frequency of the video signal, and "S" indicates a central frequency of an audio signal.

A mechanism for generating a neighboring interference will be explained in reference to FIGS. 8(a) and 8(b). FIG. 8(a) illustrates a spectrum of the B-system, and FIG. 8(b) illustrates a spectrum of the D-system. The video signal is AM modulated with the point P of 38.9 MHz as a central frequency, and the side band on the upper side is cut in relation to the band restriction of the channel, and only the side band on the lower side appears.

Then, the central frequency P' of the video signal in the adjacent channel is 31.9 MHz in the B-system as 7 MHz in the channel band width is separated; and is 30.9 MHz in the D-system as 8 MHz in the channel band width is separated. For this reason, with the structure wherein the SIF signal of 32.4 MHz 6.5 MHz separated passes, i.e., the frequency difference between the video carrier wave and the audio carrier wave in the D-system, upon receiving the B-system broadcasting, based on the video signal of the adjacent channel of 31.9 MHz, the interference generates in the audio signal. For this reason, as illustrated in FIG. 9, the audio demodulating circuit provided with a plurality of trap members 32 and 33 in the IF signal line 31 may be used.

However, as indicated with a reference numeral 34 in FIG. 1, only by merely adopting a plurality of trap members 32 and 33, as indicated with a reference numeral 34 in FIG. 10, a sufficient selectivity cannot be ensured with respect to the selectivity of the trap members 32 and 33 shown by the reference numerals 35 and 36, and in some case, a necessary signal may be attenuated.

As a typical prior art to solve the foregoing deficiencies, Japanese Unexamined Patent Application No. 9-298754/1997 (Date of publication: Nov. 18, 1997). In this prior art, by switching between the trap members 32 and 33, it is possible to use only an appropriate trap member, and mutual interferences can be obtained.

However, in this prior art, in response to the user operation, it is necessary to control (switch the broadcasting system) the circuit based on the control signal as input from the external section, and the user need to perform troublesome tasks each time switching the local station.

The control signal as input from the described external section is an I/O (input/output interface) signal as generated in a microcomputer in an external section, and a circuit is required for converting the I/O signal into a signal which permits each circuit in the audio demodulating circuit becomes operable. Specifically, it is necessary to separately provide a switching circuit which is set to be 5V with the control signal logic of "1", and is set to be 0V with the control signal logic of "0", thereby presenting the problem in that a variable and a large scale circuit is needed.

SUMMARY OF THE INVENTION

It is an object of the present invention to provide an audio demodulating circuit which is capable of switching a trap circuit automatically by itself without using an externally applied special signal, thereby realizing the simplified structure and reducing the processes the user performs.

In order to achieve the above object, an audio demodulating circuit for demodulating audio signals in a plurality of broadcasting systems of mutually different frequency deviations, is characterized by including:

a trap circuit;

connection means for connecting the trap circuit to an intermediate frequency (IF) signal line; and connection control means for controlling a connection state of the connection means based on a control voltage, the control voltage being applied from a phase comparator to a voltage control oscillator (VCO) which generates a local oscillating (LO) signal for extracting an audio signal from the IF signal.

According to the foregoing structure, in demodulating the voice signal in a plurality of broadcasting systems of mutually different frequency deviations, such as the NTSC and the PAL, the receiving RF (high frequency) signal is mixed with a carrier frequency signal, and the resulting mixed signal is subjected to frequency conversion. The resulting signal is further mixed with an LO (local oscillating) signal as generated by the VCO (voltage control oscillator), thereby extracting the audio signal.

According to the foregoing structure, in the audio demodulating circuit, in order to suppress the neighboring interference, one or the plurality of trap circuits are provided, and these trap circuits are either selectively connected by the connection means, or all the trap circuits are separated. In the control to selectively connect the trap circuit, or to disconnect all the trap circuits, the connection control means uses a control voltage prepared in the voice demodulating circuit to be applied to the VCO from the phase comparator.

It is therefore possible to automatically switch the trap circuit by the voice demodulating circuit itself without using an externally applied special signal such as a signal for switching the broadcasting system, etc., thereby simplifying the structure and reducing the operations the user performs.

For a fuller understanding of the nature and advantages of the invention, reference should be made to the ensuing detailed description taken in conjunction with the accompanying drawings.

BRIEF DESCRIPTION OF THE DRAWINGS

FIGS. 7($a$) to 7($c$) are diagrams, each showing a spectrum of an IF signal;

FIG. 8($a$) and FIG. 8($b$) are diagrams, each illustrating a spectrum of an IF signal for use in explaining an adjacent interference generating mechanism;

DESCRIPTION OF THE EMBODIMENTS

First Embodiment

Figure 1:
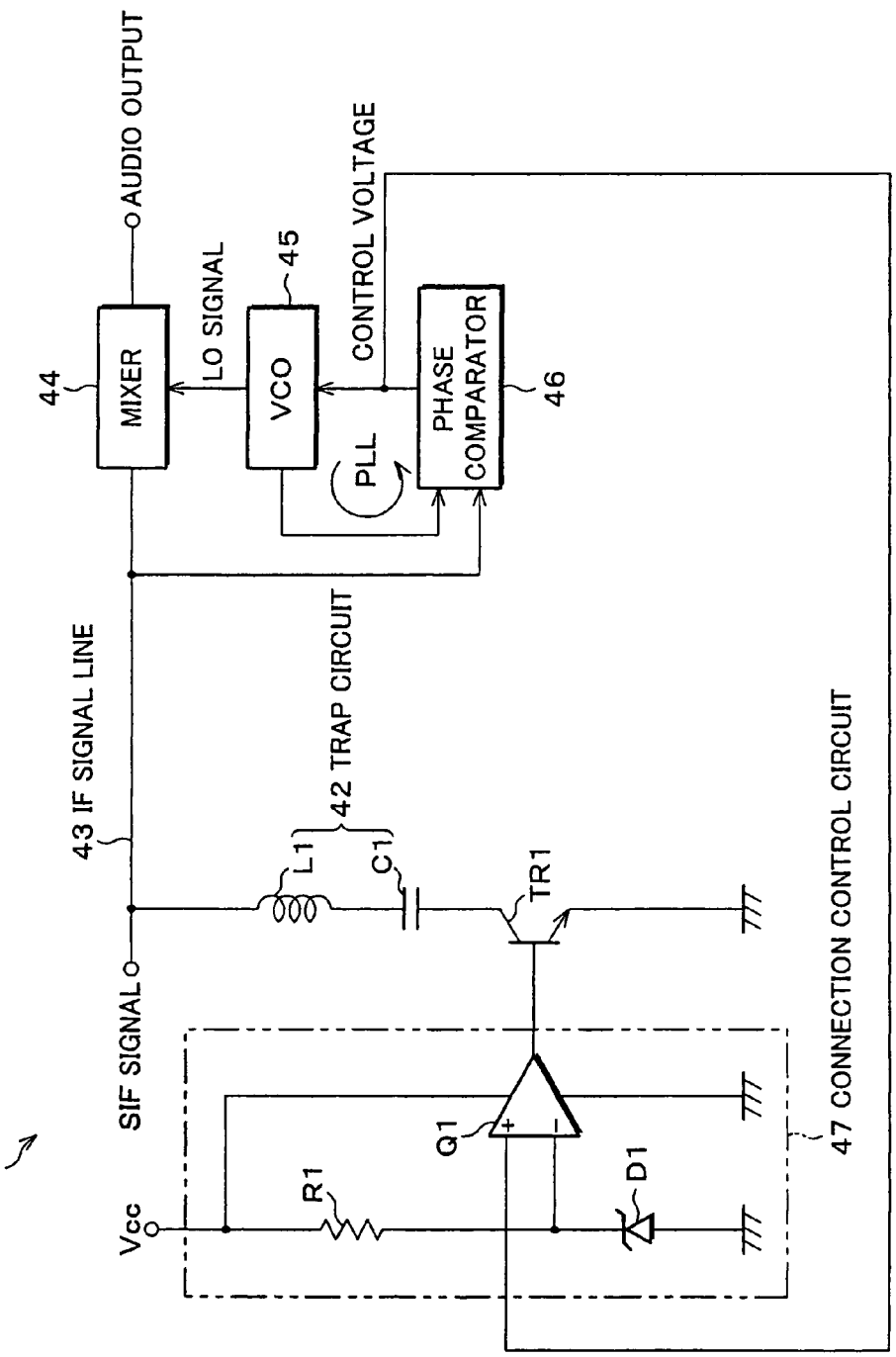
FIG. 1 is a block diagram illustrating an electrical structure of au audio demodulating circuit in accordance with the first embodiment of the present invention.
Figure 5:
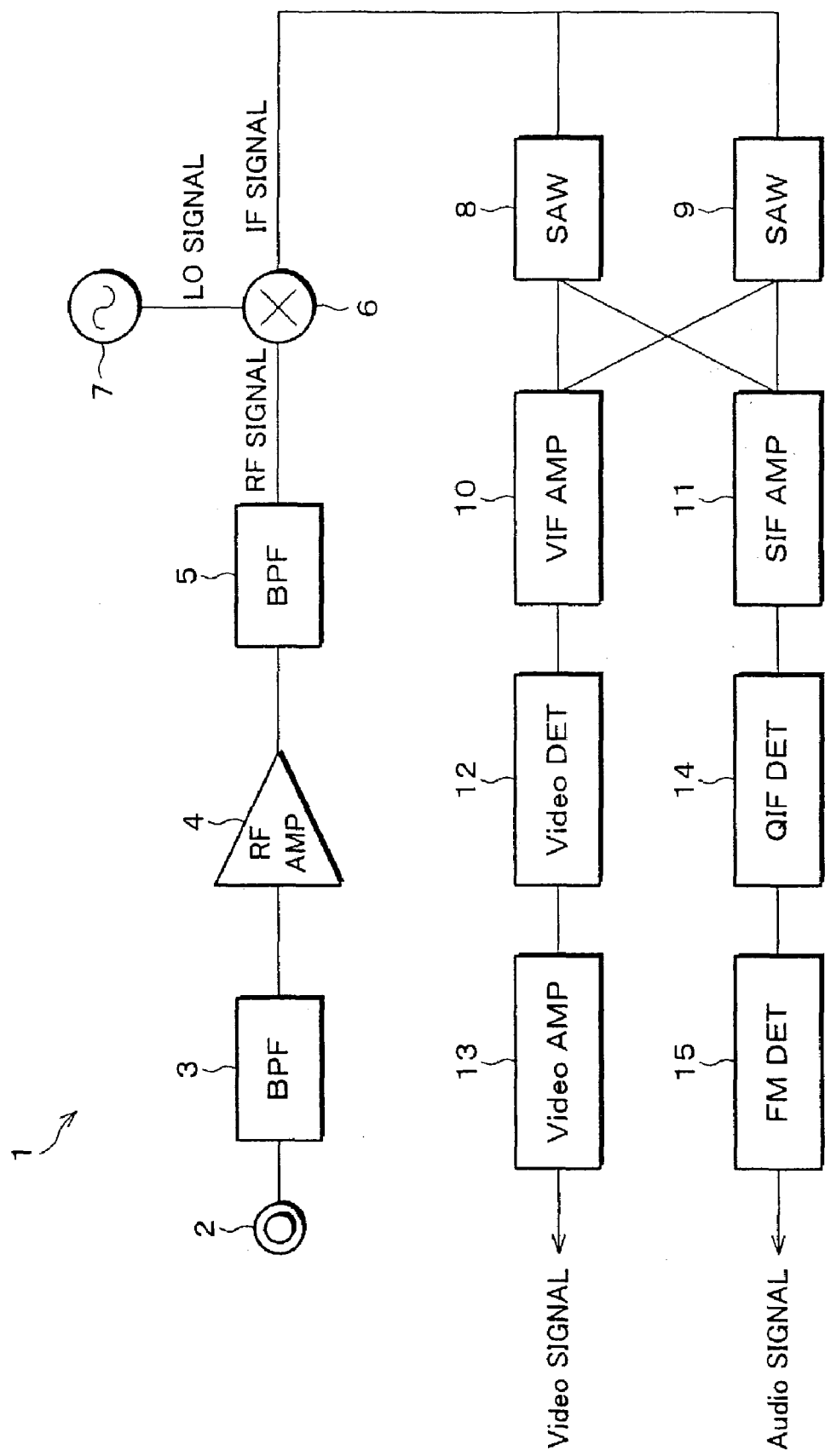
FIG. 5 is a block diagram illustrating an electrical structure of a television broadcast receiver applicable to the NTSC broadcasting system and the PAL broadcasting system for demodulating using an SIF signal.
Figure 6:
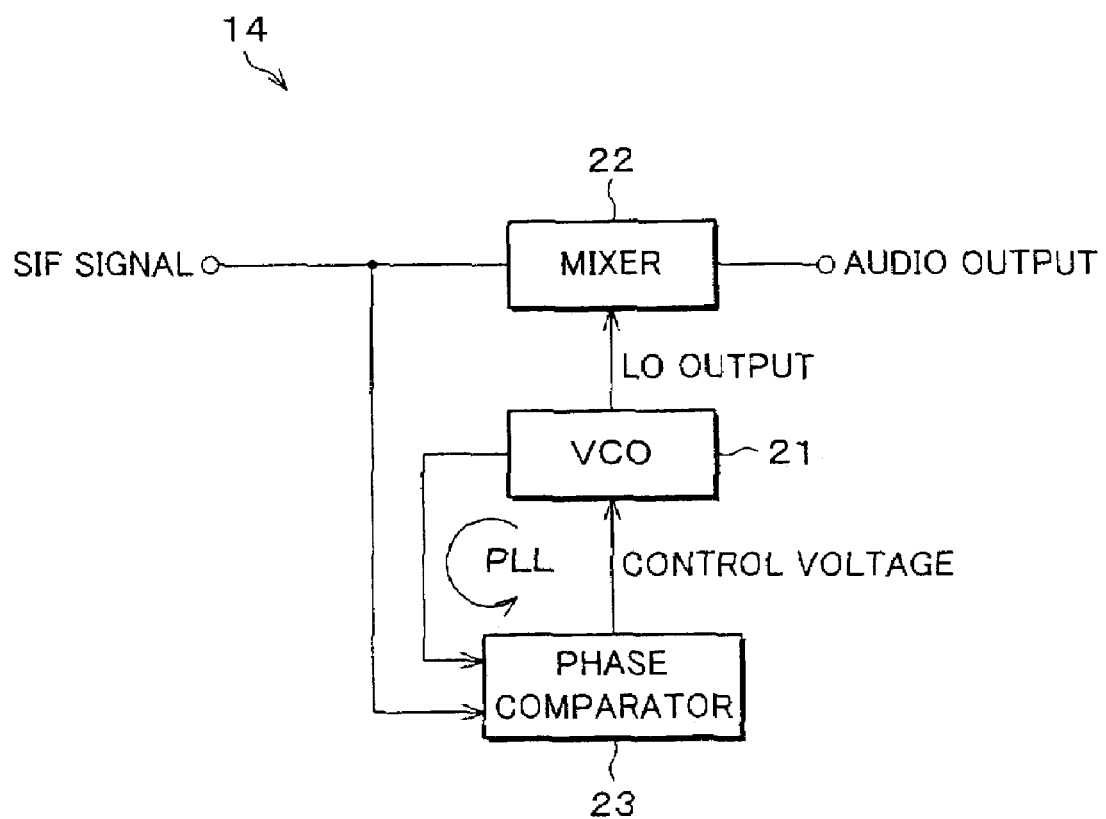
FIG. 6 is a block diagram illustrating one example of a conventional audio demodulating circuit when using a PLL.
Figure 9:
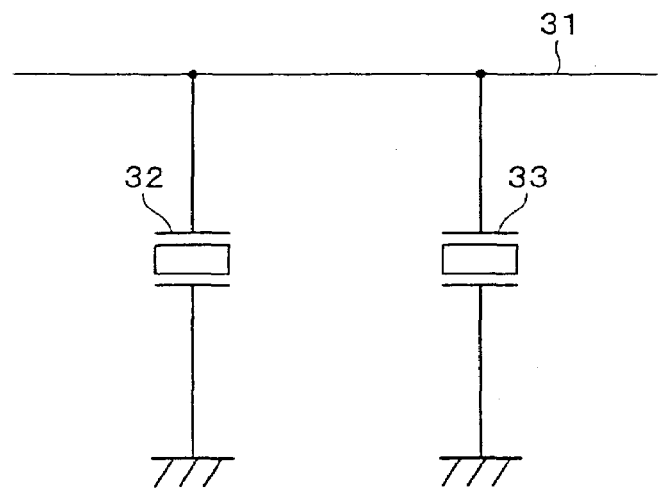
FIG. 9 is a diagram illustrating a conventional trap circuit.
Figure 10:
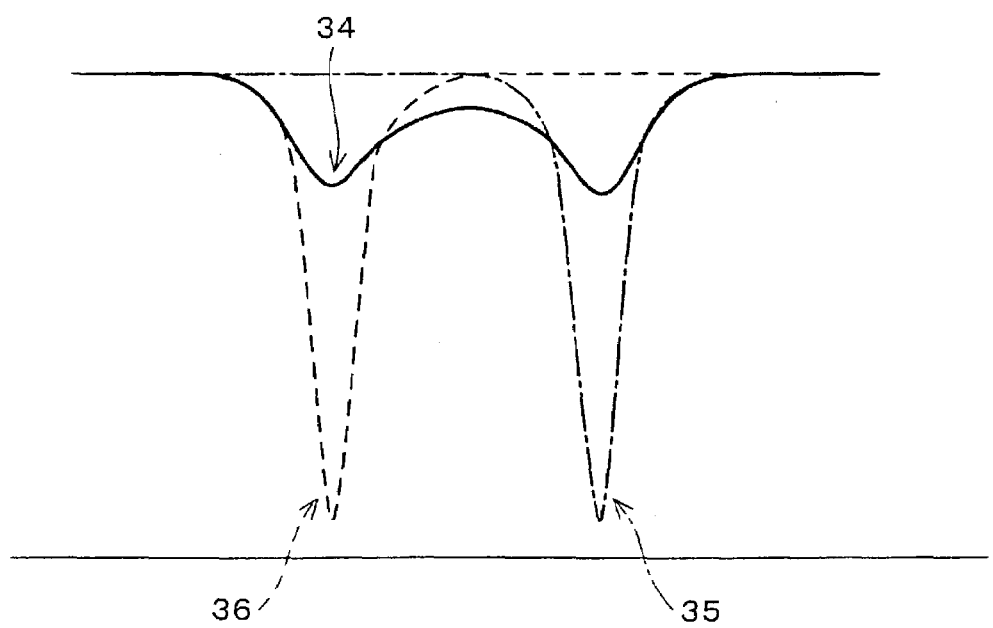
FIG. 10 is a diagram illustrating characteristics of the trap circuit of FIG. 9.

The following descriptions will discuss one embodiment of the present invention in reference to FIG. 1, and FIGS. 5 and 6. FIG. 1 is a block diagram illustrating an electrical structure of an audio demodulating circuit 41 in accordance with the present embodiment. The audio demodulating circuit 41 can be used as the audio demodulating circuit 14 of the receiver 1 explained earlier. In this audio demodulating circuit 41, a trap circuit 42 is a series circuit of a coil L1 and a condenser C1. This trap circuit 42 is placed between an IF signal line 43 and ground, and is connected/disconnected by a transistor TR1 which serves as connection means.

For example, the coil L1 has an inductance of 0.68 μH, and the condenser C1 has an electrostatic capacitance of 39 pF. For the transistor TR1, for example, a switching transistor 2SC2735 available from Hitachi Ltd. may be adopted.

Then, a SIF signal is input to a mixer 44 via an IF signal line 43, where it is mixed with an LO signal output from a VCO (Voltage Controlled Oscillator) 45. Then, by differentiating these signals, an audio output to the FM wave detecting circuit 15 can be extracted. The VCO 45 outputs as the LO signal, a sine wave signal of a frequency corresponding to a control voltage from a phase comparator 46. The phase comparator 46 compares the respective phases of the LO signal and the SIF signal, and outputs a control voltage corresponding to the phase difference between the LO signal and the SIF signal.

Therefore, these VCO 45 and the phase comparator 46 constitute the PLL, and follow changes in frequency of the SIF signal. Further, by preparing the LO signal of the same frequency with high precision, it is possible to produce LO signals corresponding to a variety of frequencies of the SIF signal.

It should be noted here that in the present invention, a base of the transistor TR1 is controlled by a connection control circuit 47. This connection control circuit 47 is constituted by a resistance R1, a Zener diode D1, and a comparator Q1. The resistance R1 and the Zener diode D1 are connected in series, and are placed between a power supply line of a predetermined power voltage Vcc and ground. Then, a reference voltage is output from the connection point between the resistance R1 and the Zener diode D1, and is input to one of the input terminals, i.e., the input terminal (−) of the comparator Q1.

For example, the resistance R1 has a resistance value of 1 kΩ, and the Zener diode D1 has a Zener voltage of 2.15 V. The comparator Q1 can be realized, for example, by an amplifier TA75S01F available from Toshiba Co., Ltd. To the other input terminal (+) of the comparator Q1, applied is a control voltage to be applied to the VCO 45 from the phase comparator 46.

In the IC storing the audio demodulating circuit capable of receiving almost all the multi-audio systems, to control the voltage of the VCO 45, the electric field condenser of around 10 μF is mounted to the outside for smoothing, and the AC component is removed. For this purpose, a terminal is provided at the external section of the IC, and this terminal typically has the VCO control voltage, and this VCO control voltage corresponds to the voltage of the ninth terminal in the IC M 52343AFP available from Mitsubishi Electric Corporation. In this IC, a voltage of around 2.0 V is output in the B-system or the G-system, and a voltage of around 2.1 V is output in the I-system, and a voltage of around 2.3 V is output in the D-system or the K-system. In the present invention, this voltage is used directly in the IC, and is applied to the other input terminal (+) of the comparator Q1.

Then, the foregoing comparator Q1 outputs a signal of High level to a base of the transistor TR1 when the control voltage of the VCO 45 is higher than the reference voltage by the resistance R1 and the Zener diode D1. The transistor TR1 is then set ON, and the trap circuit 42 composed of the coil L1 and the condenser C1 is connected to the IF signal line 43 and ground.

In contrast, when the control voltage of the VCO 45 is lower than the reference voltage set by the resistance R1 and the Zener diode D1, the comparator Q1 outputs a low level signal to the base of the transistor TR1. As a result, the transistor TR1 is set OFF, which, in turn, disconnects the trap circuit 42 from the IF signal 43 and ground.

For example, when adopting the above M52342AFP, in the B-system, the control voltage is around 2.0 V, and the voltage of the other input terminal (+) of the comparator Q1 is around 2.0 V; whereas, by setting the voltage of one of the input terminals, i.e., the terminal (−) to 2.15 V, the output voltage is set to 0V. As a result, the base voltage of the transistor TR1 is set to 0V, and the collector and the emitter of the transistor TR1 are set OFF, which, in turn, disconnects the trap circuit 42.

On the other hand, in the D-system, the control voltage is around 2.3V, and the voltage of the other input terminal (+) of the comparator Q1 is also 2.3 V, whereas by setting the voltage of one of the input terminals, i.e., the input terminal (−) to 2.15 V, the output voltage is set in the High level. As a result, the collector and the emitter of the transistor TR1 are set ON, which, in turn, connects the trap circuit 42.

With this structure, when controlling the trap circuit 42 to be connected/disconnected, the connection control circuit 47 uses the control voltage which is generated in the IC provided with the audio demodulating circuit 41, and which is to be applied to the VCO 45 from the phase comparator 46. Therefore, the switching for the foregoing control can be performed without automatically using an externally applied special signal such as a signal for switching the broadcasting system, thereby simplifying the structure and reducing the processes the user performs.

The foregoing trap circuit 42 can be realized by a low cost structure with the coil L1 and the condenser C1.

Second Embodiment

Figure 2:
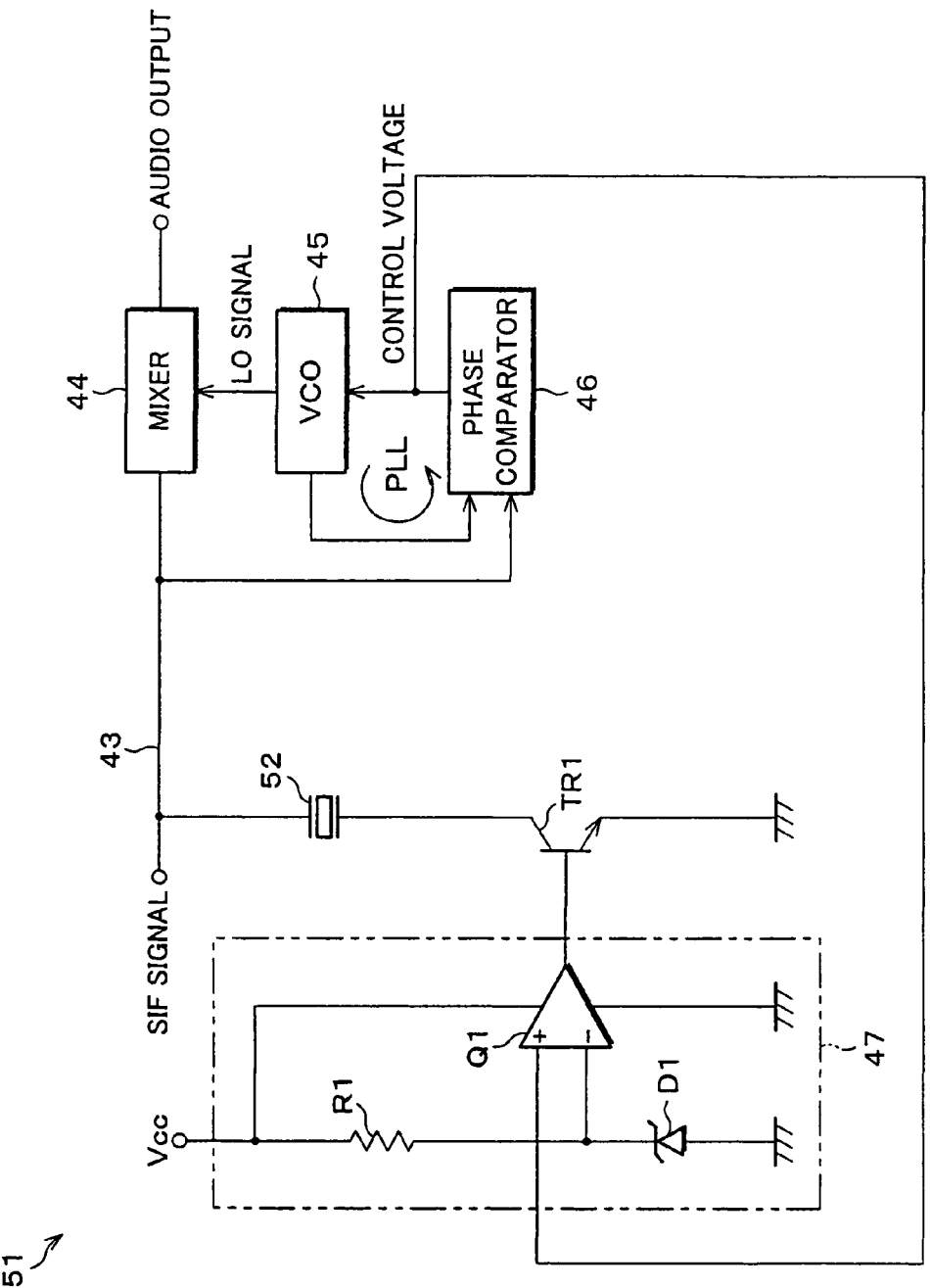
FIG. 2 is a block diagram illustrating an electrical structure of an audio demodulating circuit in accordance with the second embodiment of the present invention.

The following descriptions will discuss the second embodiment of the present invention in reference to FIG. 2. For convenience in explanations, members having the same functions as those adopted in the foregoing embodiment will be designated by the same reference numerals, and the descriptions thereof shall be omitted here.

FIG. 2 is a block diagram illustrating the electrical structure of an audio demodulating circuit 51 in accordance with the second embodiment of the present invention. This audio demodulating circuit 51 has a similar structure to the audio demodulating circuit 41 adopted in the first embodiment. However, in the audio demodulating circuit 41, the trap circuit 42 is the series circuit composed of the coil L1 and the condenser C1; whereas, in the audio demodulating circuit 51, a trap circuit 52 is constituted by a trap element utilizing the piezoelectric effect. For this trap circuit 52, for example, an MKTGA30M9AALP00B05 available from Murata Manufacturing Company Ltd. may be adopted.

As described, by adopting the trap element of desirable trap (attenuation) performances for the trap circuit 52, it is possible to remove adjacent interference with high precision.

Third Embodiment

Figure 3:
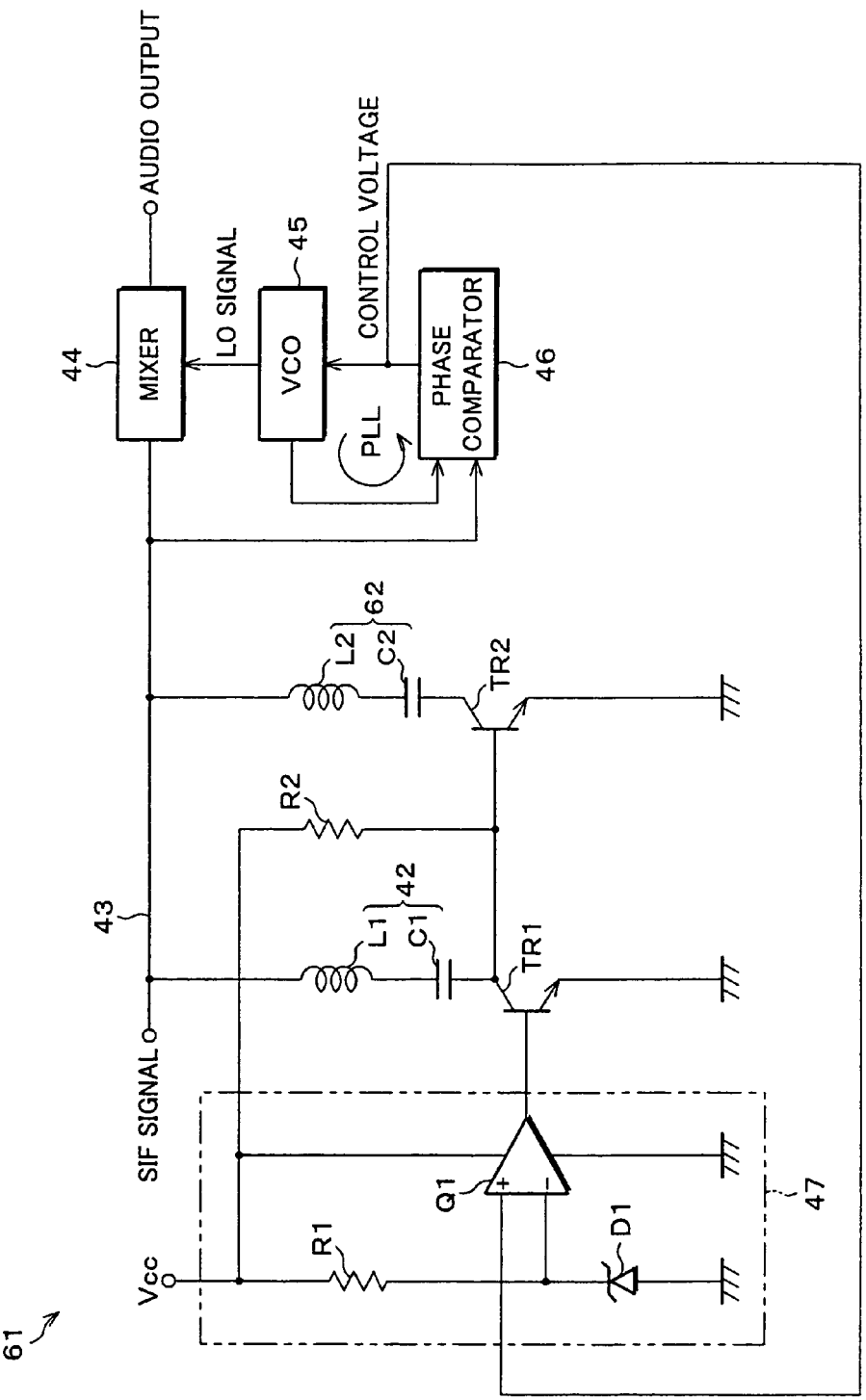
FIG. 3 is a block diagram illustrating an electrical structure of an audio demodulating circuit in accordance with the third embodiment of the present invention.

The following descriptions will discuss the third embodiment of the present invention in reference to FIG. 3. For convenience in explanations, members having the same functions as those adopted in the foregoing embodiment will be designated by the same reference numerals, and the descriptions thereof shall be omitted here.

FIG. 3 is a block diagram illustrating an electrical structure of an audio demodulating circuit 61 in accordance with the third embodiment. This audio demodulating circuit 61 has a similar structure to the audio demodulating circuit 41 adopted in the first embodiment. However, in the audio demodulating circuit 41, one trap circuit 42 is adopted; whereas, in the audio demodulating circuit 61, two trap circuits 42 and 62 are adopted. This trap circuit 62 is a series circuit composed of a coil L2 and a condenser C2 as in the trap circuit 42 adopted in the first embodiment. This trap circuit 62 is placed between the IF signal line 43 and ground, and is connected/disconnected by a transistor TR2 which serves as the connection means. Therefore, to a base of the transistor TR2, applied is an output from the collector of the transistor TR1, and a base of the transistor TR2 is connected to a power supply line of the power voltage Vcc via a pull-up resistance R2.

For example, the coil L2 has an inductance of 0.68 μH, and the condenser C2 has an electrostatic capacitance of 33 pF. For the transistor TR2, for example, a switching transistor 2SC2735 available from Hitachi Ltd. may be adopted as in the case of the transistor TR1. The pull-up resistance R2 has a resistance value of, for example, 10 kΩ.

Therefore, when the control voltage of the VCO 45 is higher than the reference voltage by the resistance R1 and the Zener diode D1, and the comparator Q1 outputs a high level signal to the base of the transistor TR1, the transistor TR1 is set ON, and the trap circuit 42 composed of the coil L1 and the condenser C1 is connected to the IF signal line 43 and ground. In this case, the collector potential of the transistor TR1 is set to the ground level, and the transistor TR2 is set OFF, which, in turn, disconnects the trap circuit 62 composed of the coil L2 and the condenser C2 from between the IF signal line 43 and ground.

In contrast, the control voltage of the VCO 45 is lower than the reference voltage by the resistance R1 and the Zener diode D1, the comparator Q1 outputs a low level signal to the base of the transistor TR1. As a result, the transistor TR1 is set OFF, which, in turn, disconnects the trap circuit 42 from between the IF signal line 43 and ground. In this state, the collector potential of the transistor TR1 is pulled up by the pull-up resistance R2, and the transistor TR2 is set ON, and the trap circuit 62 is then connected to the IF signal line 43 and ground.

With the foregoing structure, it is possible to selectively connect the trap circuit 42 or the trap circuit 62, each being applicable to two broadcast systems, to the IF signal line 43. Therefore, desirable characteristics without mutual interference can be realized by using only an appropriate trap circuit.

Fourth Embodiment

Figure 4:
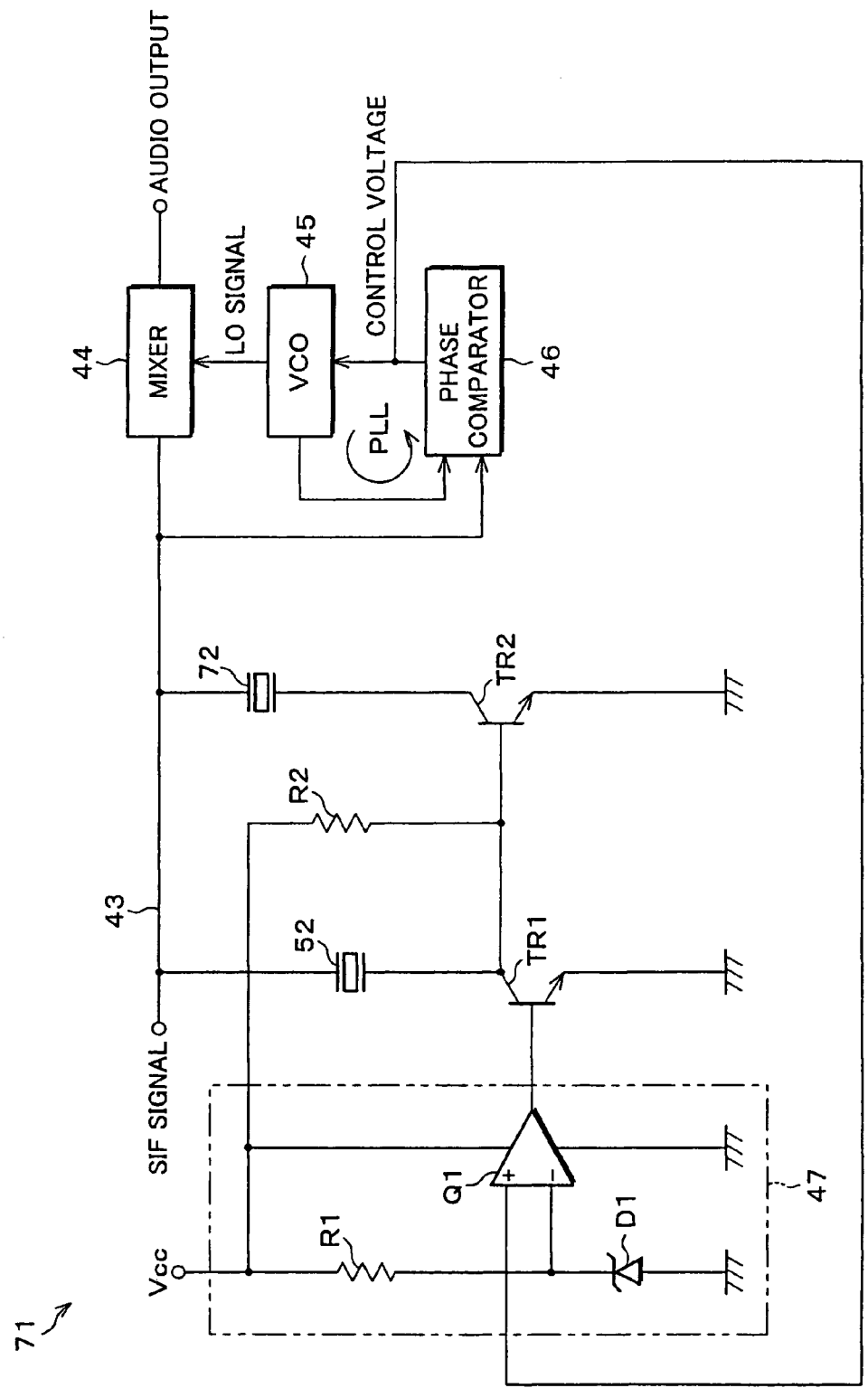
FIG. 4 is a block diagram illustrating an electrical structure of an audio demodulating circuit in accordance with the fourth embodiment of the present invention.

The following descriptions will discuss the fourth embodiment of the present invention in reference to FIG. 4. For convenience in explanations, members having the same functions, as those adopted in the foregoing first through third embodiments will be designated by the same reference numerals, and the descriptions thereof shall be omitted here.

FIG. 4 is a block diagram illustrating the electrical structure of an audio demodulating circuit 71 in accordance with the fourth embodiment of the present invention. This audio demodulating circuit 71 has a similar structure to the audio demodulating circuit 61 adopted in the third embodiment. However, in the audio demodulating circuit 61, adopted are two trap circuits 42 and 62 which are the series circuits, each being composed of the coil L1 and the condenser C1 or the coil L2 and the condenser C2; whereas, in the audio demodulating circuit 71, adopted are two trap circuits 52 and 72, each being composed of a trap element utilizing the piezoelectric effect, as in the case of the trap circuit 52 adopted in the audio demodulating circuit 51 of the second embodiment. However, the trap circuit 72 differs from the trap circuit 52 in that, for example, an MKTGA31M9AALP00B05 available from Murata Manufacturing Company Ltd. can be adopted for the trap circuit 72 of the present embodiment.

According to the foregoing structure, by adopting the trap element of desirable trap (attenuation) performances for the trap circuits 52 and 72, these trap circuits 52 and 72 can be selectively used.

In the control to selectively connect the trap circuit, or to disconnect all the trap circuits, the connection control means uses a control voltage prepared in the voice demodulating circuit to be applied to the VCO from the phase comparator. It is therefore possible to automatically switch by the voice demodulating circuit without using an externally applied special signal such as a signal for switching the broadcast system, etc., thereby simplifying the structure and reducing the operations the user performs.

In the audio demodulating circuit of the present invention, a series circuit composed of a coil and a condenser is adopted for the trap circuit, for the connection means, a transistor for connecting/disconnecting the series circuit to/from the IF signal line and ground is adopted, and for the connection control means, a comparator is adopted for comparing the control voltage with a predetermined reference voltage and controlling the connection state of the connection means based on a result of comparison.

With the above structure, the trap circuit, the connection means and the connection control means of the present invention can be realized. Here, by adopting the trap circuit, a reduction in manufacturing cost can be realized.

As another example structure for the audio demodulating circuit of the present invention, the following arrangement may be adopted: A trap element utilizing the piezoelectric effect is adopted for the trap circuit, a transistor for connecting/disconnecting the trap element to/from the IF signal line and ground is adopted for the connection means, and a comparator for mutually comparing the control voltage with the predetermined reference voltage and controlling the connection state of the connection means based on the result of comparison is adopted for the connection control means.

With the above structure, the trap circuit, the connection means and the connection control means of the present invention can be realized. Here, since a trap element of desirable trap (attenuation) performances is adopted for the trap circuit, the desirable effect of removing the neighboring interference can be achieved.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An audio demodulating circuit for demodulating audio signals in a plurality of broadcast systems of mutually different frequency deviations, comprising:
    a voltage control oscillator for generating a local oscillating signal for extracting an audio signal from an intermediate frequency signal line;
    a phase comparator for generating control voltages for controlling the voltage control oscillator, and outputting one of the control voltages to the voltage control oscillator, the control voltages corresponding to the respective frequency deviations;
    a trap circuit;
    connection means for selectively connecting said trap circuit to the intermediate frequency signal line; and
    connection control means for controlling a connection state of said connection means based on the control voltages.

2. The audio demodulating circuit as set forth in claim 1, wherein:
    said trap circuit is a series circuit composed of a coil and a condenser.

3. The audio demodulating circuit as set forth in claim 1, wherein:
    said trap circuit is a trap element utilizing the piezoelectric effect.

4. The audio demodulating circuit as set forth in claim 1, wherein:
    said connection means is a transistor for connecting/disconnecting said trap circuit to/from an intermediate frequency signal line and ground.

5. The audio demodulating circuit as set forth in claim 1, wherein:
    said connection control means is a comparator for comparing the control voltages with a predetermined reference voltage and controlling the connection state of said connection means based on a result of comparison.

6. The audio demodulating circuit as set forth in claim 1, wherein:
    said trap circuit is a series circuit composed of a coil and a condenser; and
    said connection means is a transistor for connecting/disconnecting said series circuit to/from the intermediate frequency signal line and ground; and
    said connection control means is a comparator for comparing said control voltages with a predetermined reference voltage and controlling the connection state of said connection means based on a result of comparison.

7. The audio demodulating circuit as set forth in claim 1, wherein:
    said trap circuit is a trap element utilizing the piezoelectric effect;
    said connection means is a transistor for connecting/disconnecting said trap element to/from the intermediate frequency signal line and ground; and
    said connection control means is a comparator for comparing said control voltages with a predetermined reference voltage and controlling the connection state of said connection means based on a result of comparison.

8. The audio demodulating circuit as set forth in claim 1, wherein:
    said trap circuit is provided in plural number; and
    said connection control means connects one of said plurality of trap circuits or selectively connects at least one of said plurality of trap circuits.

9. A television broadcast receiver provided with an audio demodulating circuit for demodulating audio signals in a plurality of broadcast systems of mutually different frequency deviations, wherein:
    said audio demodulating circuit comprises:
    a voltage control oscillator for generating a local oscillating signal for extracting an audio signal from an intermediate frequency signal line;
    a phase comparator for generating control voltages for controlling the voltage control oscillator, and outputting one of the control voltages to the voltage control oscillator, the control voltages corresponding to the respective frequency deviations;
    at least one trap circuit;
    connection means for connecting said trap circuit or in the case where said trap circuit is provided in plural number, selectively connecting at least one of said plurality of trap circuits to the intermediate frequency signal line; and
    connection control means for controlling a connection state of said connection means based on the control voltages.

10. The audio demodulating circuit as set forth in claim 1, wherein the control voltages are set according to the plurality of broadcast systems.

* * * * *